Patented Dec. 24, 1935

2,025,323

UNITED STATES PATENT OFFICE 2,025,323

SOLDER

Carl Wunderle, St. Louis, Mo., assignor of fifteen per cent to Frank A. Hunter, St. Louis, Mo.

No Drawing. Application October 1, 1934, Serial No. 746,418

1 Claim. (Cl. 75—1)

This invention relates generally to solders, and more specifically to an improved soft solder intended particularly for use in the manufacture of tin containers such as cans, the predominant object of the invention being to provide a solder which in a number of respects hereinafter referred to is superior to solders heretofore used in the manufacture of cans.

The improved soft solder is made up of amounts of lead, tin, bismuth, and sal ammoniac, and the solder is produced in the following manner:

To produce 16 ounces of the solder a 12-ounce piece of ingot lead is fused in a crucible, the heat necessary to accomplish the fusing of the lead being approximately 600° F. To the fused lead ¼ of a gram of sal ammoniac is added and the fused lead is stirred well so that all the ashes which contain arsenic, iron, copper, and other undesired elements will collect on the surface of the fused lead. The ashes are removed from the surface of the fused lead, and when the lead is clean 3.13 ounces of pure block tin (banke) is added to the fused lead. After the lead and tin are completely fused 0.87 ounce of bismuth is added to the mixture, after which the mixture is stirred well and the alloy is finished and ready to be cast in bars, sticks, cables, or strings.

Experiments show that the improved solder is capable of quicker cooling than is any similar solder heretofore known, and therefore an increase in ductility is obtained. Also, the improved solder requires the use of less heat in melting same and in the work up of the solder. The solder disclosed herein is thinner than any other known similar solder, hence less tin is used on cans which results in a saving to can manufacturers. Furthermore, tests show a better combining of the fused metals making up the solder, so that the fused mixture is of uniform specific gravity from the top to the bottom of the crucible. This results in a solder of uniform body throughout.

An important feature of the invention is that the improved solder does not discolor and has the same color as 50—50 or 40—60, or 25—75 solder. Also, the improved solder is cleaner, as all unclean elements are removed from the lead and tin forming parts of the fused mixture and therefore no "dead" solder, as it is commonly called, is present in the finished solder. The amount of bismuth when combined with the lead shows a reduction in lead oxide which is a very important matter, inasmuch as the solder is used in soldering containers for food that might be contaminated by lead oxide.

When the improved solder is used in soldering machines of the type known as "floaters" it will not form a hard crust or an unclean surface. This is a great advantage to can manufacturers, as it enables them to produce finer and cleaner soldered food containers. Also of importance to the can manufacturer is the fact that the danger incident to the presence of lead oxide is very greatly reduced.

Tests have shown that as far as tensile strength of the improved solder is concerned my solder is equal to any similar solder heretofore known.

I claim:

The process of producing a given amount of solder, which comprises fusing substantially 12 ounces of lead in a crucible, adding substantially ¼ of a gram of sal amoniac to the fused lead, after which the mixture is thoroughly stirred so that all ashes which contain arsenic, iron, copper, and other undesired elements will be caused by said sal ammoniac to collect at the surface of the fused lead, adding substantially 3.13 ounces of tin to the fused mixture after said ashes have been removed, and adding substantially 0.87 ounce of bismuth to the mixture after the lead and tin are completely fused, the mixture being thoroughly stirred after the addition of said bismuth.

CARL WUNDERLE.